(12) United States Patent
Ninomiya

(10) Patent No.: US 6,536,862 B2
(45) Date of Patent: Mar. 25, 2003

(54) INKJET PRINTING APPARATUS AND IMAGE DATA GENERATION METHOD OF SAID APPARATUS

(75) Inventor: Takayuki Ninomiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/013,445

(22) Filed: Dec. 13, 2001

(65) Prior Publication Data

US 2002/0075342 A1 Jun. 20, 2002

(30) Foreign Application Priority Data

Dec. 20, 2000 (JP) ............... 2000-387704

(51) Int. Cl.[7] .................................. B41J 2/205
(52) U.S. Cl. ....................................... 347/15
(58) Field of Search ............... 347/15, 14, 19, 347/43

(56) References Cited

U.S. PATENT DOCUMENTS

| | | |
|---|---|---|
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,608,577 A | 8/1986 | Hori |
| 4,709,274 A | * 11/1987 | Tanioka ............... 358/283 |
| 4,723,129 A | 2/1988 | Endo et al. |
| 4,740,796 A | 4/1988 | Endo et al. |
| 5,841,518 A | * 11/1998 | Kajiwara ............... 355/40 |
| 6,238,037 B1 | * 5/2001 | Overall et al. ......... 347/41 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |

* cited by examiner

Primary Examiner—Thinh Nguyen
(74) Attorney, Agent, or Firm—Fitzpatrick, Cella, Harper & Scinto

(57) ABSTRACT

When image data is generated based on a drawing command by an inkjet printing apparatus which performs printing on a print medium with the use of an inkjet printhead discharging ink, an area of a graphic to be drawn is calculated based on the received drawing command, and it is determined whether or not the area exceeds a predetermined value, and whether or not a density value of the graphic exceeds a predetermined density value based on the drawing command. In accordance with the two determination results, the density value is converted, and image data is generated based on the converted apparatus value. Accordingly, occurrence of cockling can effectively be prevented without largely increasing a load imposed on hardware.

17 Claims, 9 Drawing Sheets

INKJET PRINTING APPARATUS AND IMAGE DATA GENERATION METHOD OF SAID APPARATUS

FIELD OF THE INVENTION

The present invention relates to an inkjet printing apparatus and image data generation method of said apparatus, and more particularly, to an inkjet printing apparatus and image data generation method of said apparatus, which can effectively prevent occurrence of cockling while performing printing with an inkjet printhead which discharges ink based on information transmitted by an external apparatus.

BACKGROUND OF THE INVENTION

A printing apparatus serving as a printer, copying machine, facsimile apparatus or the like, or a printing apparatus serving as an output apparatus of a work station or composite electronic device including a computer or word processor or the like, is configured to print an image on a print medium, such as paper or a plastic sheet, based on image data. Printing apparatuses of this type are categorized by the printing methods they adopt: an inkjet method, wire-dot method, thermal method, laser method and so on.

An inkjet printer adopting the inkjet method performs printing with the use of a printhead serving as printing means, which discharges ink on a print medium. The inkjet printer has the following advantages: easy to downsize printing means, the ability to print high-definition images at high speed, ability to print on regular paper without requiring special processing, low running cost, low-noise operation because of its non-impact method, easy to print color images with multiple colors of ink, and so forth.

Particularly a printhead having high-density fluid passages (discharge orifices), employed in the inkjet method for discharging ink by utilizing heat energy, can easily be manufactured by the semiconductor manufacturing processes of etching, deposition and sputtering. Therefore, the entire printing apparatus can be further downsized. In the similar sense, a printing apparatus adopting the thermal method can be further downsized similar to the inkjet printer.

The recent trend in such inkjet printer is a system in which a host apparatus transmits a printing command to a printer in the page description language (PDL) so as to share the transmitting data irrespective of the resolution of printers.

Steps of generating printing image data to be used in printing based on an image drawing command written in the PDL are described with reference to the block diagram in FIG. 5. An image drawing command 501, transmitted by the host computer, is transferred to the inkjet printer through a communication cable or the like. The inkjet printer interprets and processes the received command at a command interpretation unit 502 to generate various printing image data, and stores the generated data in image memory 510.

The image drawing command 501 represents a group of image drawing commands. FIG. 6 shows the format of each command. Each image drawing command consists of image shape information 601, image position/size information 602, image density information 603, and fill-in information 604. The image shape information 601 indicates a shape, such as a circle, square, and so on. The image position/size information 602 indicates, for instance if the image is a circle, X and Y coordinates of the center and the radius of the circle. The image density information 603 indicates a color, e.g., red, blue, or green, and density thereof in a specified range (e.g., 0 to 255). The fill-in information 604 indicates whether or not the image is just a line of circle with no fill-in patterns or a circle whose circumference and inside the circle are filled in.

Among these information, the image shape information 601 and image position/size information 602, which are related to the image drawing position, are processed by an image shape interpretation unit 503, then the drawing position is determined by an image position interpretation unit 504, and outputted by a memory control unit 505 as the memory address information of actual image memory 510. Meanwhile, the image density information 603 is subjected to γ conversion, which is unique to the printing apparatus, by an image density conversion unit 507, and outputted as color data of the image to the image memory 510. A fill-in control unit 506 interprets the fill-in information 604 to determine existence/absence of filled-in areas, and controls a value outputted to the image density conversion unit 507 based on the information of the memory control unit 505.

In inkjet printers, there is an important relation between print paper and the amount of ink droplets discharged per unit area (also called a discharge amount).

When a large amount of ink droplets is discharged onto print paper, cellulose which constitutes paper swells in the print paper. In particular, when ink having a characteristic of low permeability into print paper is used, the ink droplet discharged by a printhead hardly permeates through the print paper, thus remains on the print paper surface. As a result, the aforementioned phenomenon of cellulose swelling takes place only on the face of the print paper surface, resulting in different surface areas on the face and back of the print paper. Ultimately, a corrugation phenomenon, called cockling, occurs in the portion of the print paper surface on which a large amount of ink droplets is discharged. Furthermore, in a case where a large amount of ink droplets is discharged on the entire page of print paper, a curling phenomenon of the print paper takes place.

When the cockling phenomenon occurs, the spaces between print paper and a printhead become unstable. Variations of the ink droplet discharging direction cause to lose stability in the ink droplet discharging position on the print paper surface, resulting in image quality deterioration. Furthermore, when the curling phenomenon occurs, it is difficult to align print paper in case of printing plural pages, imposing inconvenient handling. In addition, the curling phenomenon can cause snagging of paper or malfunction in the printer.

In order to prevent the above-described cockling or curling, methods have been proposed to limit the ink discharge amount based on actual printing image data or halftone image data, which is the pre-stage data of the actual printing image data.

However, according to the proposed methods, data processing must be performed on each pixel data. Therefore, processing a high-resolution image increases the number of times of operation. This processing requires hardware with high processing speed, and also is time consuming. Furthermore, it is difficult to control the ink discharge amount in accordance with each print medium used.

SUMMARY OF THE INVENTION

The present invention has been proposed to solve the conventional problems, and has as its first object to provide an inkjet printing apparatus, which can effectively prevent the occurrence of cockling without largely increasing a load imposed upon hardware.

The second object of the present invention is to provide an image data generation method of the inkjet printing apparatus, which can effectively prevent the occurrence of cockling without largely increasing a load imposed upon hardware.

Another object of the present invention is to provide a computer program and storage medium storing the program, which implements the image data generation method of the inkjet printing apparatus.

According to the present invention, the first object is attained by providing an inkjet printing apparatus for printing on a print medium based on a drawing command with the use of an inkjet printhead for discharging ink, said apparatus comprising: calculation means for calculating an area of a graphic to be drawn based on the drawing command; first determination means for determining whether or not the calculated area exceeds a predetermined value; second determination means for determining based on the drawing command whether or not a density value of the graphic exceeds a predetermined density value; and density conversion means for converting the density value in accordance with determination results of the first and second determination means.

Furthermore, according to the present invention, the second object is attained by providing an image data generation method for generating image data for printing on a print medium by an inkjet printhead for printing by discharging ink, said method comprising: a calculation step of calculating an area of an image to be drawn based on the drawing command; a first determination step of determining whether or not the calculated area exceeds a predetermined value; a second determination step of determining based on the drawing command whether or not a density value of the image exceeds a predetermined density value; a density conversion step of converting the density value in accordance with determination results of the first and second determination steps; and an image data generation step of generating the image data based on the converted value.

In other words, according to the present invention, in an inkjet printing apparatus for printing on a print medium by an inkjet printhead for discharging ink, when image data is generated based on a drawing command, an area of a graphic or an image to be drawn is calculated based on the received drawing command, and it is determined whether or not the calculated area exceeds a predetermined value, and whether or not a density value of the graphic or the image exceeds a predetermined density value based on the drawing command. In accordance with the two determination results, the density value is converted, and image data is generated based on the converted value.

According to the foregoing configuration of the present invention, image data to be used in printing is generated by reducing a density value of a portion having a high probability of cockling occurrence, based on information included in an inputted drawing command. Therefore, quick image data generation is realized without largely increasing a load imposed upon hardware. Furthermore, cockling or curling can effectively be prevented without deteriorating print quality.

Note that it is an aspect of the invention that the density value is converted when it is determined that the calculated area exceeds the predetermined value and the density value exceeds the predetermined density value.

Further, it is an aspect of the invention that the density value is reduced at a predetermined rate in the density conversion.

Still further, it is an aspect of the invention that the predetermined value and predetermined density value can be changed. For instance, to perform printing suitable to each type of print medium, the predetermined value and predetermined density value are changed in accordance with the type of print medium used.

Similarly, it is also effective to change the predetermined rate in accordance with the type of print medium used.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Brief Description of a Printing Apparatus

Figure 7:
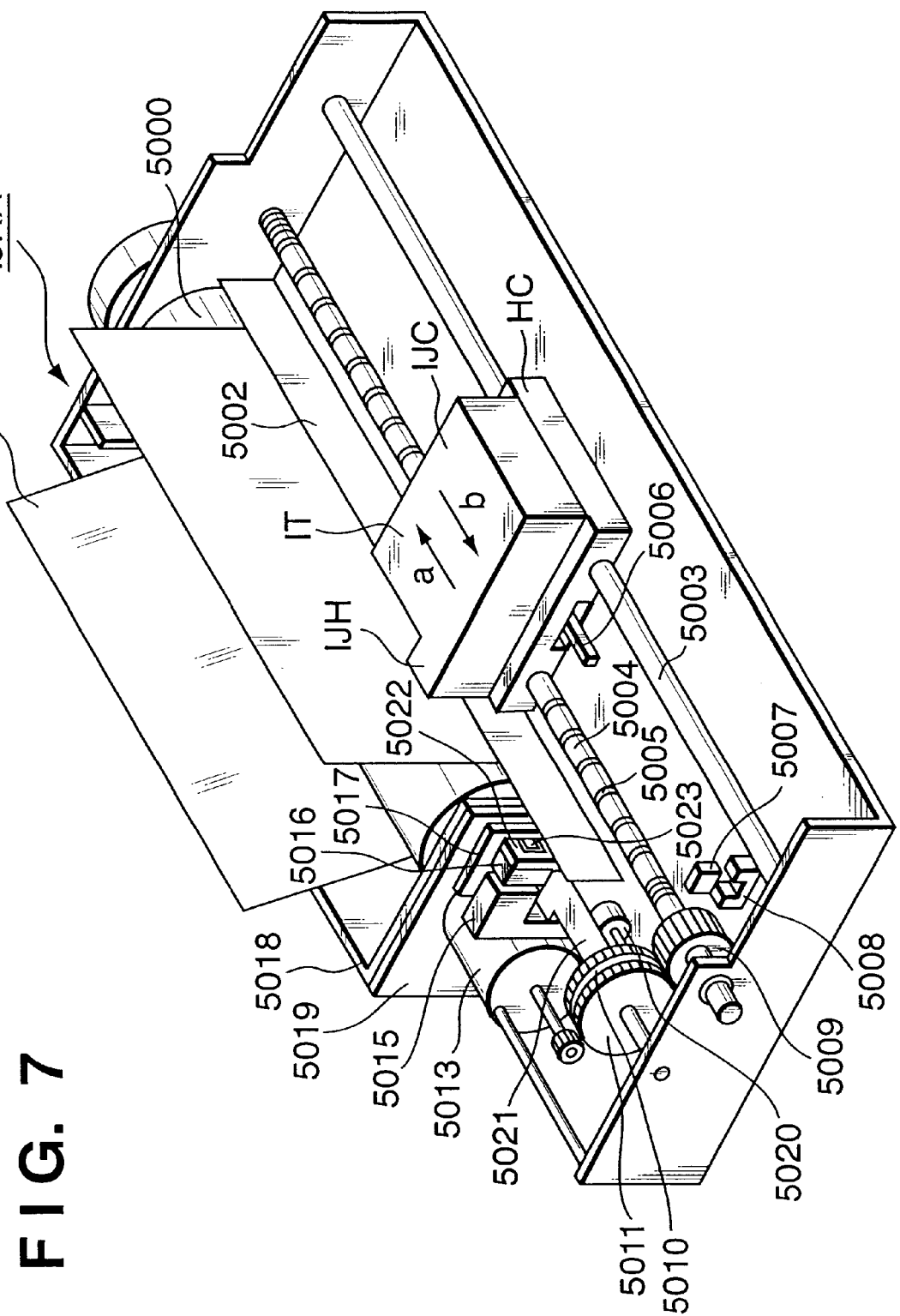
FIG. 7 is a view showing an external appearance of a printer as a preferred embodiment of the present invention.

FIG. 7 is a perspective view showing the outer appearance of an ink-jet printer IJRA as a typical embodiment of the present invention. Referring to FIG. 7, a carriage HC engages with a spiral groove 5005 of a lead screw 5004, which rotates via driving force transmission gears 5009 to 5011 upon forward/reverse rotation of a drive motor 5013. The carriage HC has a pin (not shown), and is reciprocally moved in directions of arrows a and b in FIG. 7. An integrated ink-jet cartridge IJC which incorporates a printing head IJH and an ink tank IT is mounted on the carriage HC.

Reference numeral 5002 denotes a sheet pressing plate, which presses a paper sheet against a platen 5000, ranging from one end to the other end of the scanning path of the carriage. Reference numerals 5007 and 5008 denote photo-couplers which serve as a home position detector for recognizing the presence of a lever 5006 of the carriage in a corresponding region, and used for switching, e.g., the rotating direction of motor 5013.

Reference numeral 5016 denotes a member for supporting a cap member 5022, which caps the front surface of the printing head IJH; and 5015, a suction device for suctioning ink residue through the interior of the cap member. The suction device 5015 performs suction recovery of the printing head via an opening 5023 of the cap member 5022. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Description of a Control Arrangement

Next, the control structure for performing the printing control of the above apparatus is described.

Figure 8:
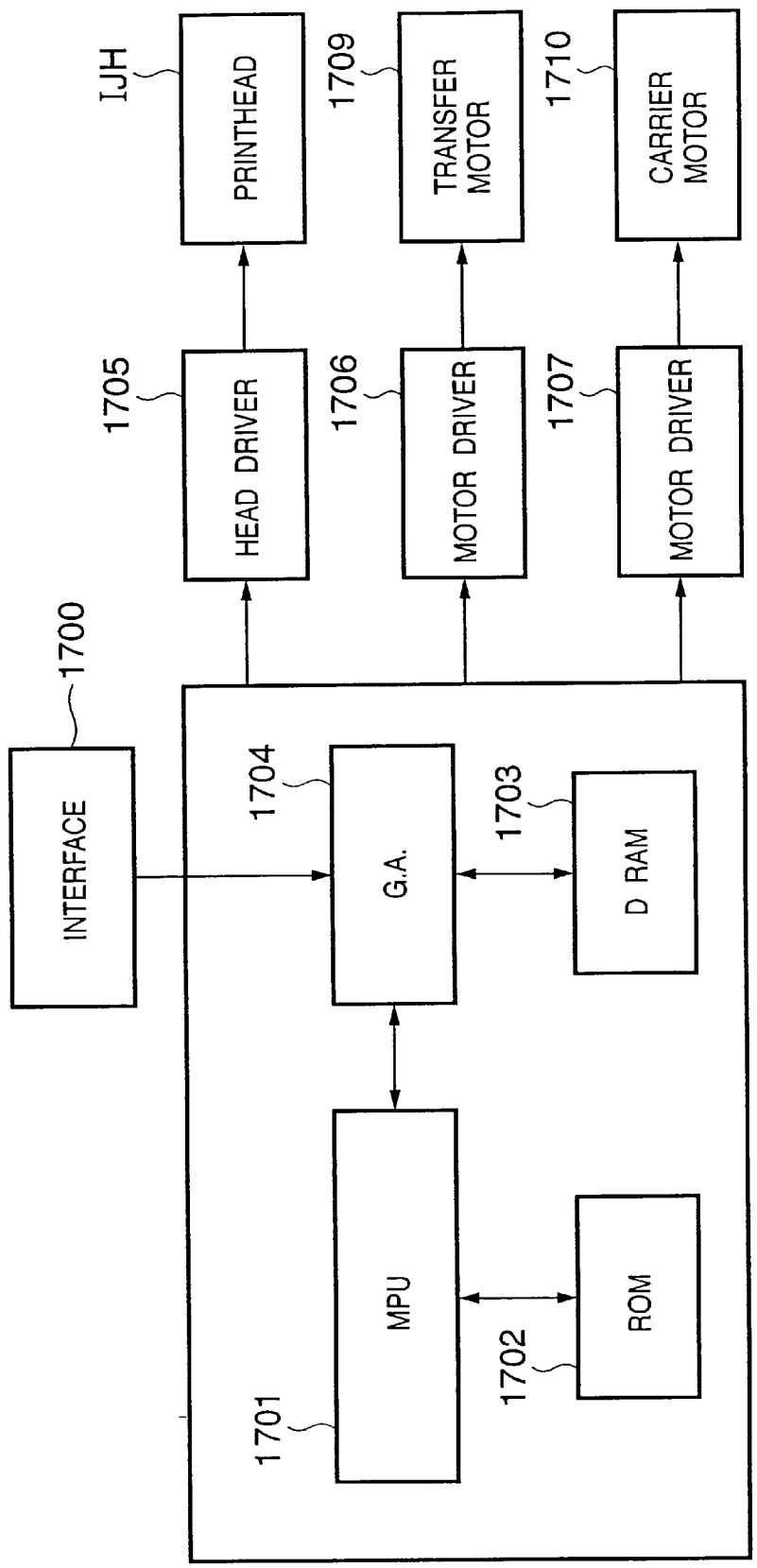
FIG. 8 is a block diagram showing a control structure of the printer shown in FIG. 7.

FIG. 8 is a block diagram showing the arrangement of a control circuit of the ink-jet printer. Referring to FIG. 8 showing the control circuit, reference numeral 1700 denotes an interface for inputting a print signal from an external unit such as a host computer; 1701, an MPU; 1702, a ROM for storing a control program (including character fonts if necessary) executed by the MPU 1701; and 1703, a DRAM for storing various data (the print signal, print data supplied to the printing head and the like). Reference numeral 1704 denotes a gate array (G. A.) for performing supply control of print data to the printing head IJH. The gate array 1704 also performs data transfer control among the interface 1700, the MPU 1701, and the RAM 1703. Reference numeral 1710 denotes a carrier motor for transferring the printing head IJH in the main scanning direction; and 1709, a transfer motor for transferring a paper sheet. Reference numeral 1705 denotes a head driver for driving the printing head; and 1706 and 1707, motor drivers for driving the transfer motor 1709 and the carrier motor 1710.

The operation of the above control arrangement will be described below. When a print signal is inputted into the interface 1700, the print signal is converted into print data for a printing operation between the gate array 1704 and the MPU 1701. The motor drivers 1706 and 1707 are driven, and the printing head is driven in accordance with the print data supplied to the head driver 1705, thus performing the printing operation.

Though the control program executed by the MPU 1701 is stored in the ROM 1702, an arrangement can be adopted in which a writable storage medium such as an EEPROM is additionally provided so that the control program can be altered from a host computer connected to the ink-jet printer IJRA.

Note that the ink tank IT and the printing head IJH are integrally formed to construct an exchangeable ink cartridge IJC; however, the ink tank IT and the printing head IJH may be separately formed such that when ink is exhausted, only the ink tank IT can be exchanged for a new ink tank.

Figure 9:
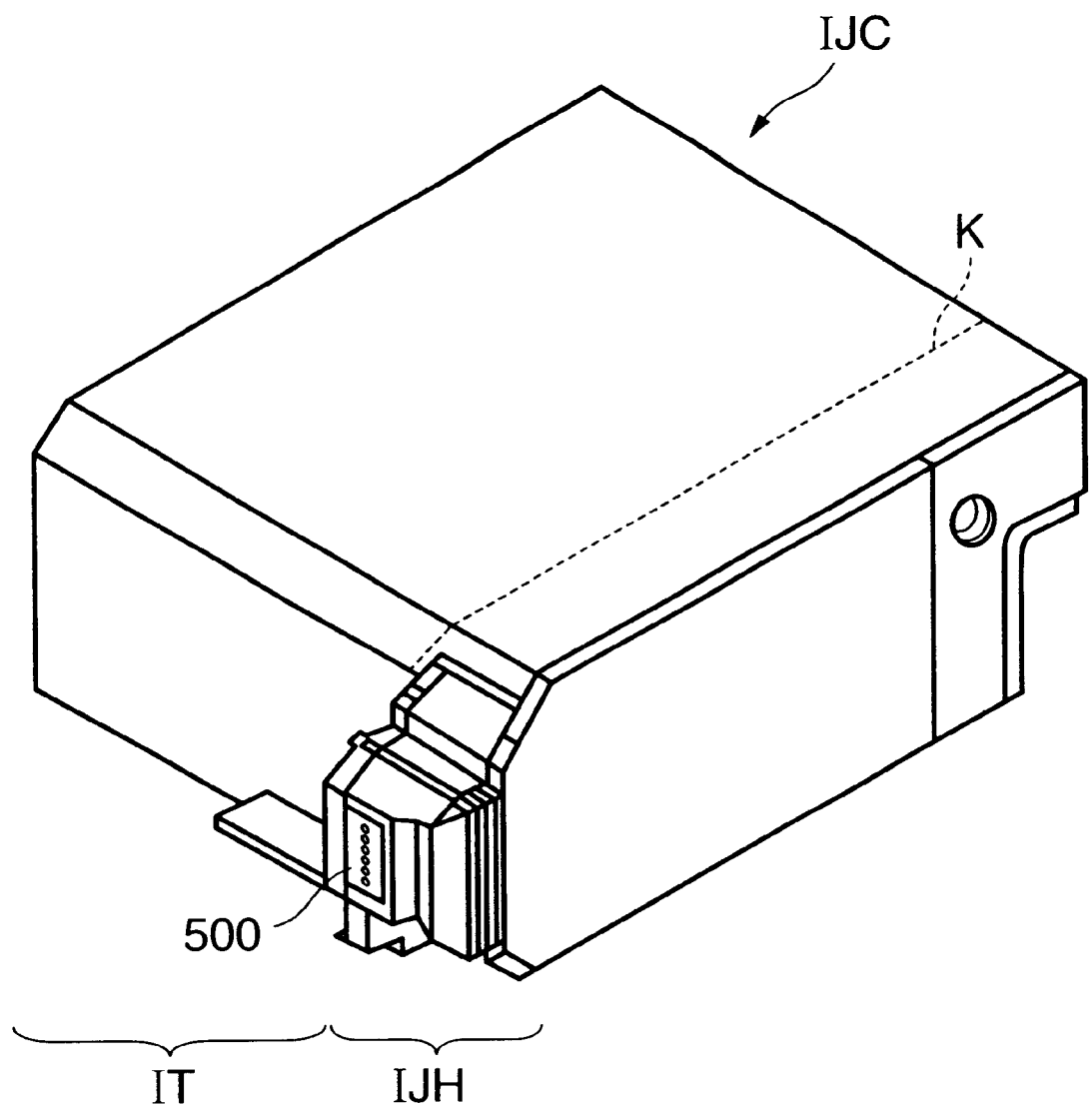
FIG. 9 is a view showing an inkjet cartridge used in the printer shown in FIG. 7.

FIG. 9 is a perspective view showing the structure of the ink cartridge IJC where the ink tank and the head can be separated. As shown in FIG. 9 in the ink cartridge ITC, the ink tank IT and the printing head IJH can be separated along a line K. The ink cartridge IJC has an electrode (not shown) for receiving an electric signal supplied from the carriage HC side when it is mounted on the carriage HC. By the electric signal, the printing head IJH is driven as above, and discharges ink.

Note that in FIG. 9, numeral 500 denotes an ink-discharge orifice array. Further, the ink tank IT has a fiber or porous ink absorbing body. The ink is held by the ink absorbing body.

Printing Image Generation Processing

Hereinafter, descriptions are provided on an embodiment where the image processing method of the present invention is applied to the above-described inkjet printer.

Figure 1:
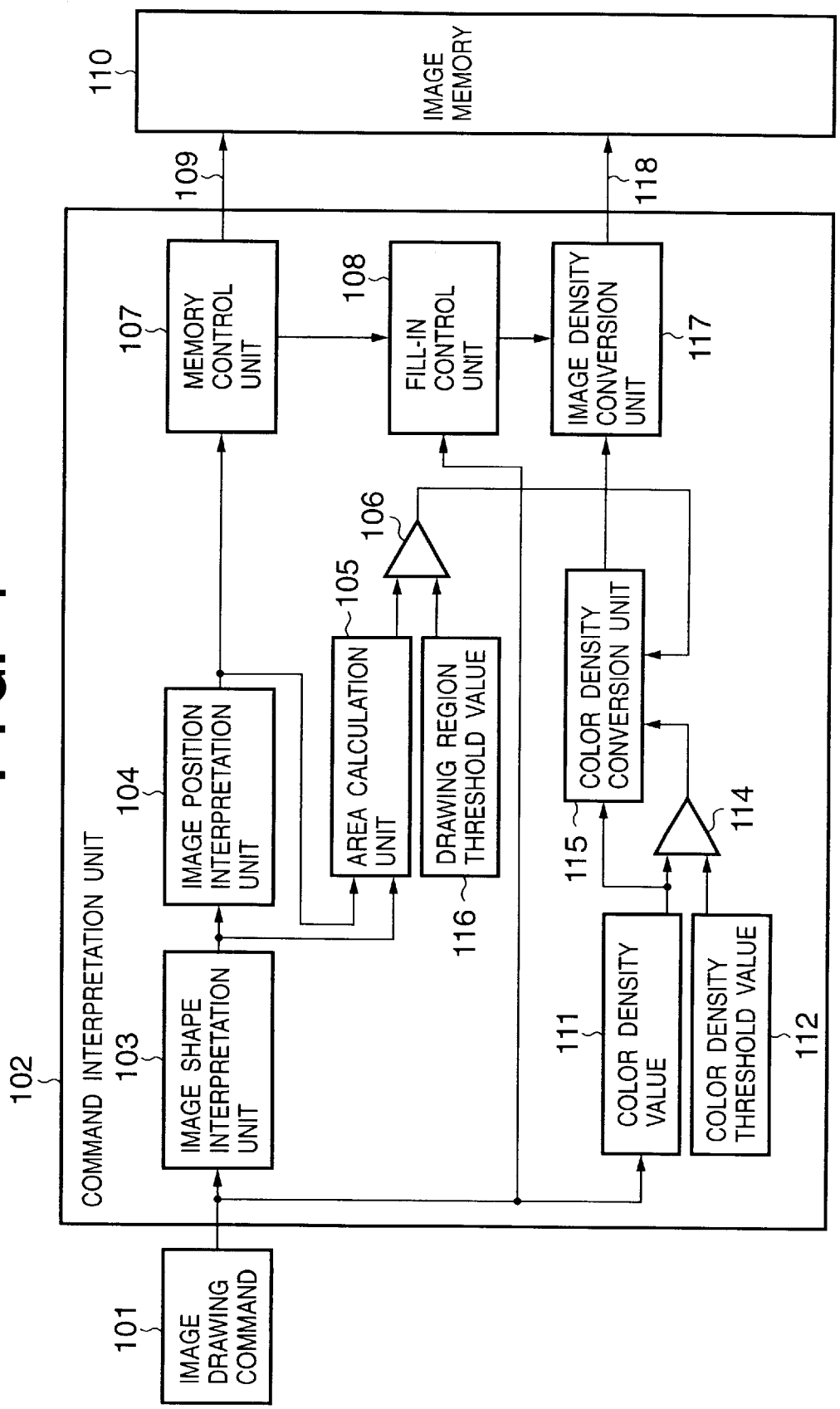
FIG. 1 is a block diagram showing functions related to printing image data generation according to an embodiment of the present invention.

FIG. 1 is a block diagram showing functions related to printing image data generation according to the present embodiment. As can be seen from the drawing, according to this embodiment, a command interpretation unit 102 performs printing image data generation and processing based on an inputted image drawing command 101, and stores the generated data in image memory 110.

The block diagrams FIGS. 1 and 8, respectively showing functions and control structures, correspond to each other as follows. The image drawing command 101 is inputted by a host computer through the interface 1700 in FIG. 8. The command interpretation unit 102 corresponds to the MPU 1701 and the internal unit of the G.A. 1704 in FIG. 8. The image memory 110 corresponds to the DRAM 1703 in FIG. 8.

Figure 6:
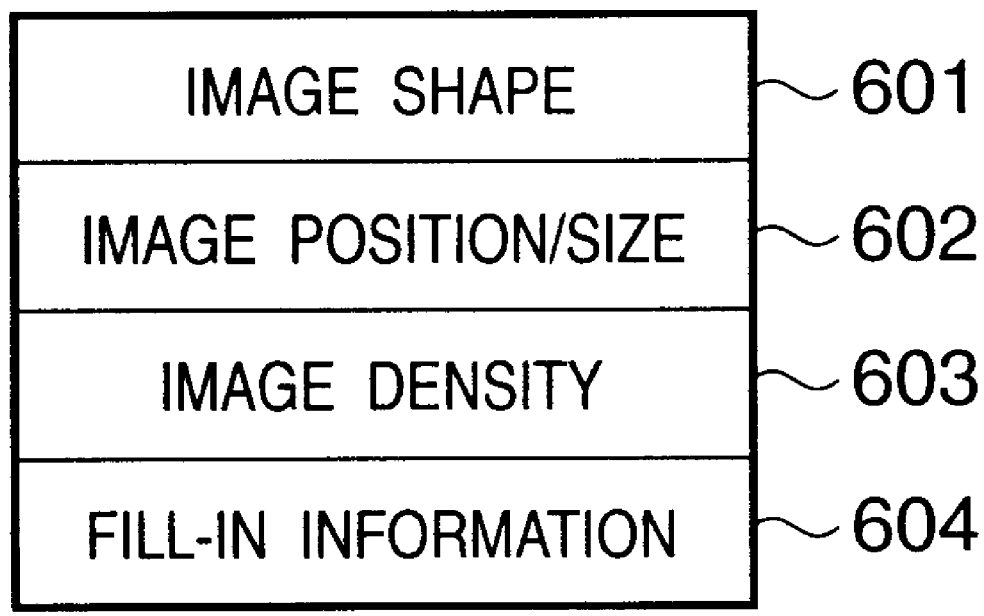
FIG. 6 is a view showing as an example a drawing command format.

The image drawing command 101, having a similar format as that described in the conventional example shown in FIG. 6, consists of image shape information 601, image position/size information 602, image density information 603, and fill-in information 604.

Figure 5:
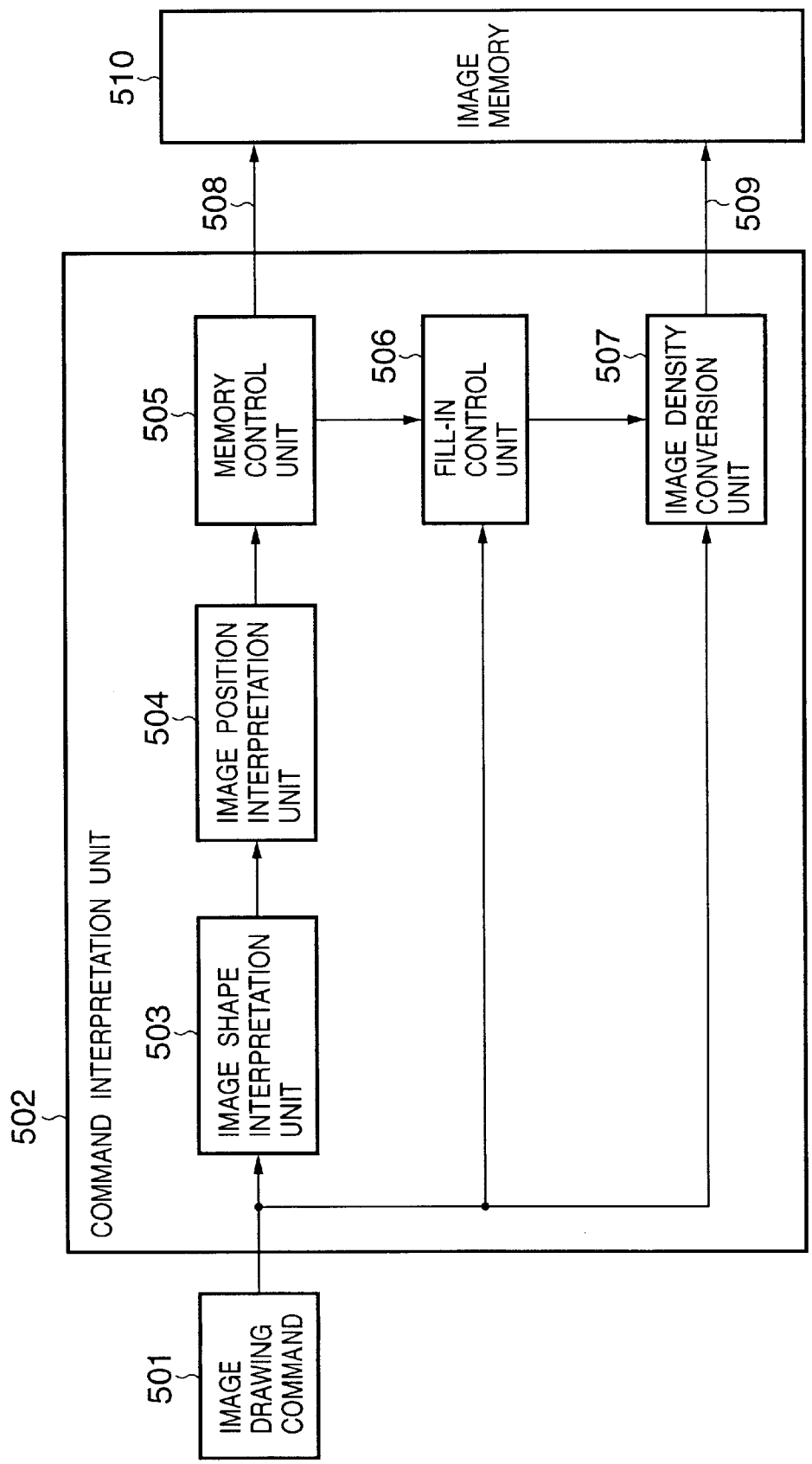
FIG. 5 is a block diagram showing functions related to conventional printing image data generation.

The command interpretation unit 102 comprises: the area calculation unit 105, drawing region threshold value 116, comparators 106 and 114, color density value 111, color density threshold value 112, and color density conversion unit 115, in addition to the image shape interpretation unit 103, image position interpretation unit 104, memory control unit 107, fill-in control unit 108, and image density conversion unit 117 which respectively correspond to the units described in the conventional example shown in FIG. 5.

The area calculation unit 105 calculates an area of a graphic to be drawn. The drawing region threshold value 116 outputs a threshold value of the area in which cockling is highly likely to occur. A plurality of threshold values are stored for plural types of print media. Therefore, a value corresponding to the type of print medium used is outputted. The comparator 106 compares the area of the graphic to be drawn with the outputted threshold value, and outputs a signal only when the area exceeds the threshold value.

The color density value 111 outputs the image density information 603 included in the image drawing command 101. The color density threshold value 112 outputs a threshold value of the density at which cockling is highly likely to occur. A plurality of threshold values are stored for plural types of print media. Therefore, a value corresponding to the type of print medium used is outputted. The comparator 114 compares the density of the portion to be drawn with the outputted threshold value, and outputs a signal only when the density exceeds the threshold value.

In a case where signals are outputted from both the comparators 106 and 114, the color density conversion unit 115 converts the color density value 111 according to a method which will be described later.

As described above, when it is determined that cockling is highly likely to occur based on the area and density value of the graphic to be drawn, the density value of the portion subjected to processing is changed to reduce the probability of cockling occurrence.

The above determination is made based upon the findings in which the cockling effect is not as conspicuous in a small printing portion (area) as in a large printing area when printing is performed with high density.

The data flow is now described. The image shape information 601 is inputted to the image shape interpretation unit 103 to specify the shape of the image. Data indicative of the shape of the image is sent to the area calculation unit 105. The image position/size information 602 is inputted to the image position interpretation unit 104, and data indicative of the size of the image is sent to the area calculation unit 105. The area calculation unit 105 calculates a drawing area based on the two types of data representing the shape and size. The drawing region threshold value 116, which is stored in the form of, e.g., a table, is set in advance based on information inputted by a user. The comparator 106, which receives the area and threshold value, outputs a signal if the drawing area exceeds the drawing region threshold value 116.

Meanwhile, the color density threshold value 112, which is stored in the form of, e.g., a table, is set in advance based on information inputted by a user. The color density threshold value 112 and color density value 111 extracted from the image density information 603 are inputted to the comparator 114 for comparison. The comparator 114 outputs a signal if the color density value 111 exceeds the color density threshold value 112.

When the color density conversion unit 115 receives the outputs from the comparators 106 and 114, the color density conversion unit 115 performs density conversion on the color density value 111 according to a method which will be described later. The new color density value, obtained by performing density conversion based on the drawing area and color density value of the drawing data, is inputted to the image density conversion unit 117, then subjected to color conversion and density conversion suitable to printing processing in the printer, and written in the image memory 110 according to the fill-in control unit 108.

Although not shown in the drawing, a reading circuit reads print information out of the printing image data, stored in the image memory 110, to be used as ink discharge data.

Hereinafter, descriptions are provided with reference to the flowchart in FIG. 2 on the operation related to density conversion processing in the printing image data generation processing according to the present embodiment. Note in FIG. 2, F indicates false and T indicates true at each determination step.

First, it is determined whether or not the color density value 111 exceeds the density threshold value 112 (step S202). If true, then it is determined whether or not the area of the graphic to be drawn, which is calculated by the area calculation unit 105, exceeds the drawing region threshold value 116 (step S203). If the determination result is false at any of the steps S202 or S203, the control ends without performing any processing.

If the determination results are true at steps S202 and S203, then it is determined whether or not a print medium to be used is the first paper (step S204). If true, a coefficient K=0.8 is set (step S208). If the print medium to be used is not the first paper, it is determined if it is the second paper (step S205). If true, a coefficient K=0.85 is set (step S207). If the print medium is neither the first nor second paper, it is decided that the third paper is used and a coefficient K=0.9 is set (step S206).

The color density value 111, subjected to density conversion, is multiplied by the set coefficient, and the converted density value is outputted (step S209).

According to the present embodiment, three types of paper can be used. The embodiment assumes a scheme in which a color density can be expressed by a single parameter. The coefficient K, which decides the density reduction rate in a high density region, is set for each type of print medium to prevent occurrence of cockling.

To express a color density, one pixel is often expressed not by a single parameter, but by a plurality of parameters. This is exemplified by a case in which densities of red (R), green (G), and blue (B) are expressed by 8 bits each. In such case, the comparator 114 for a high density portion, which is insufficient to determine each color, must make determination by using $D=f(R, G, B)$. Herein, D represents a color density value; f( ), a conversion function; and R, G, B, density values of respective colors. As an example of the conversion function f( ), an average value of the density value of each color may be used. In this case, the color density conversion unit 115 must perform density conversion described in FIG. 2 on all the colors so as not to change the color tonality.

As has been described above, according to the present embodiment, the density data of a portion having a high probability of cockling occurrence is reduced based on information included in an inputted drawing command, before being outputted as printing image data. Therefore, quick image data generation is realized without largely increasing a load imposed upon hardware. Furthermore, since the coefficient value employed to reduce the density value is changed in accordance with the type of print medium used, cockling or curling can effectively be prevented when using various types of print media.

Modification of Embodiment

Hereinafter, a modification of the above-described embodiment is described. To simplify the description, the components similar to the above-described embodiment will not be explained, but characteristic components only are described.

Figure 3:
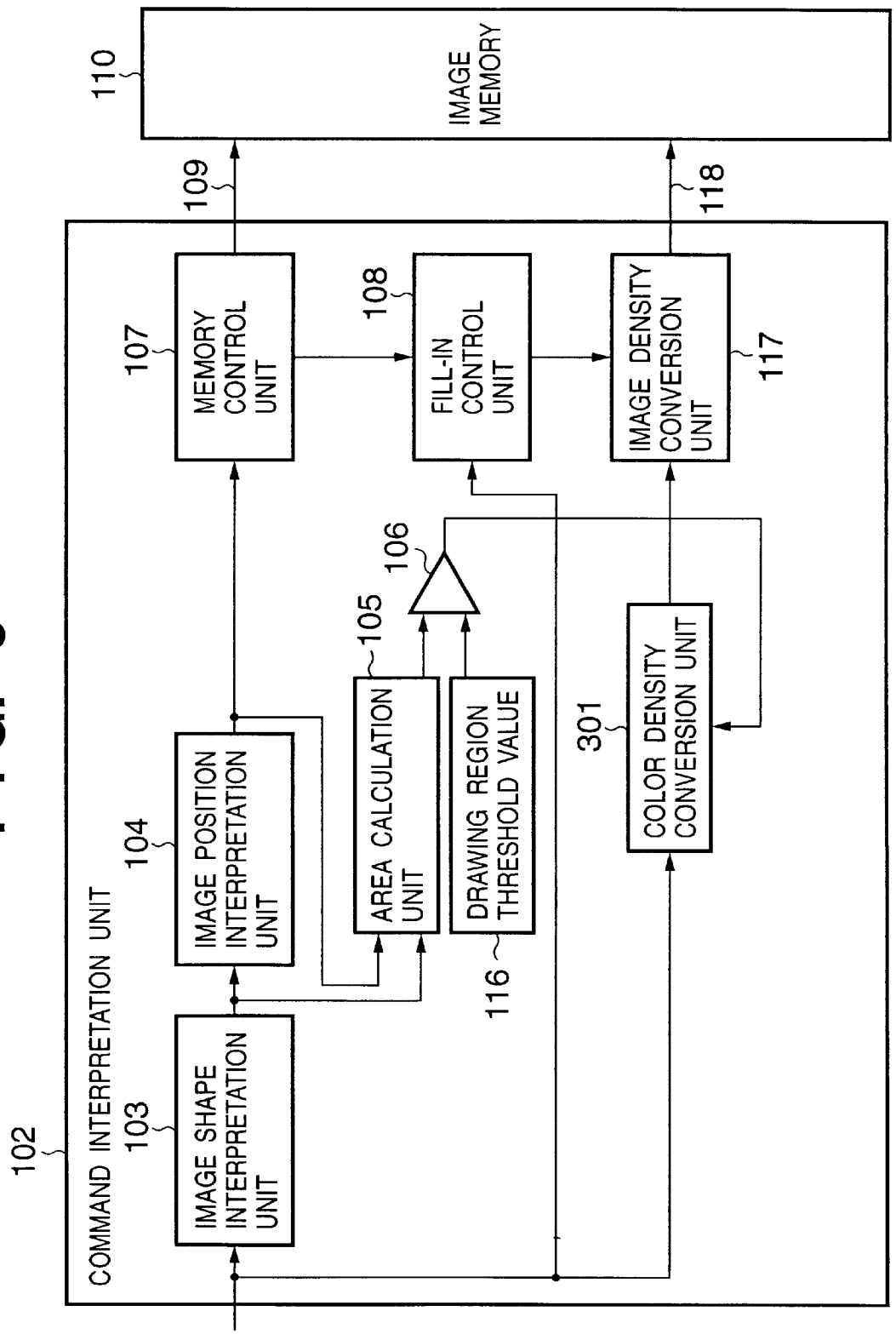
FIG. 3 is a block diagram showing functions related to printing image data generation according to another embodiment of the present invention.

FIG. 3 is a block diagram showing functions related to printing image data generation according to this modified embodiment. In the configuration of FIG. 3, a color density conversion unit 301 is provided in place of the color density value 111, color density threshold value 112, comparator 114 and color density conversion unit 115 in FIG. 1.

Figure 4:
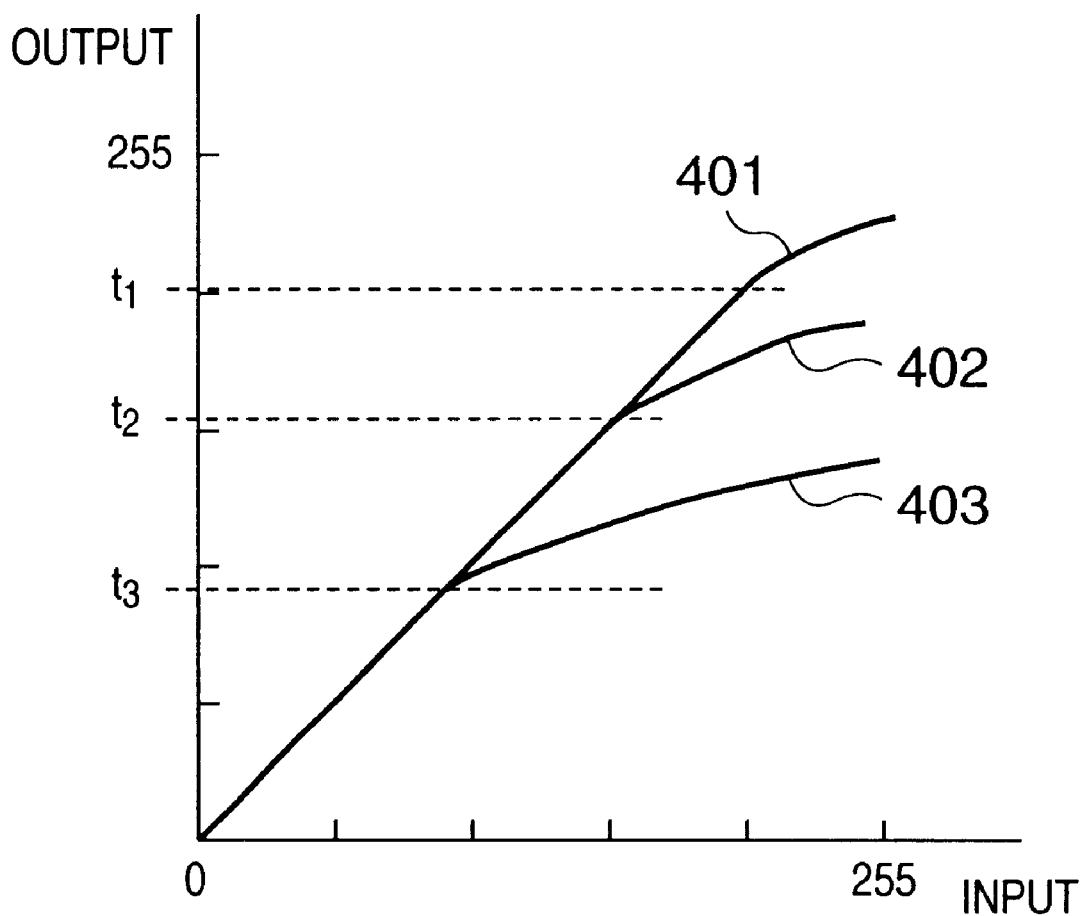
FIG. 4 is a graph showing input/output characteristics of a color density conversion unit.

FIG. 4 shows input/output characteristics of density values in the color density conversion unit 301. A density value is expressed in the range of 0 to 255, 0 being a light color and 255 being a dark color. The three types of conversion tables 401 to 403 in FIG. 4 correspond to three types of print media.

Reference numerals t1 to t3 in FIG. 4 indicate color density threshold values provided for the three types of print media included in the conversion tables 401 to 403. In all three types of print media, when an input density is equal to or lower than the color density threshold value, the output value is equal to the input value. However, when an input density exceeds the color density threshold value, the output value is reduced in accordance with the characteristic of each print medium.

By continuously performing the foregoing conversion, it is possible to reduce a density higher than a predetermined density and prevent cockling. Note that this characteristic is effective only when the comparator 106 in FIG. 1 outputs a signal.

Other Embodiment

The above-described embodiment has been described on the example in which a host apparatus, connected to an inkjet printer, transmits an image drawing command written in PDL to the printer, and the printer interprets the command to generate printing image data. However, the present invention is applicable to image data generation in other configurations. More specifically, the present invention is applicable to a case in which a printer driver stored in a host apparatus generates data to be transmitted to a printer based on an image drawing command.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, as described in Japanese Patent laid Open No. 54-56847 or Japanese Patent Laid Open No. 60-71260, an ink may be supplied in a form of perforated sheet opposed to the electrothermal transducer in which the ink is maintained in liquid or solid within a dent or a through-hole thereon. In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program code for performing the aforesaid processes in a computer system or apparatus (e.g., a personal computer), reading the program code, by a CPU or MPU of the computer system or apparatus, from the storage medium, then executing the program. In this case, the program code read from the storage medium realizes the functions according to the embodiments, and the storage medium storing the program code constitutes the invention. Furthermore, additional functions according to the above embodiments are realized by executing the program code which is read by a computer. The present invention includes a case where an OS (operating system) or the like working on the computer performs a part of or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or function expansion unit performs a part of or entire processes in accordance with designations of the program code and realizes functions of the above embodiments.

Figure 2:
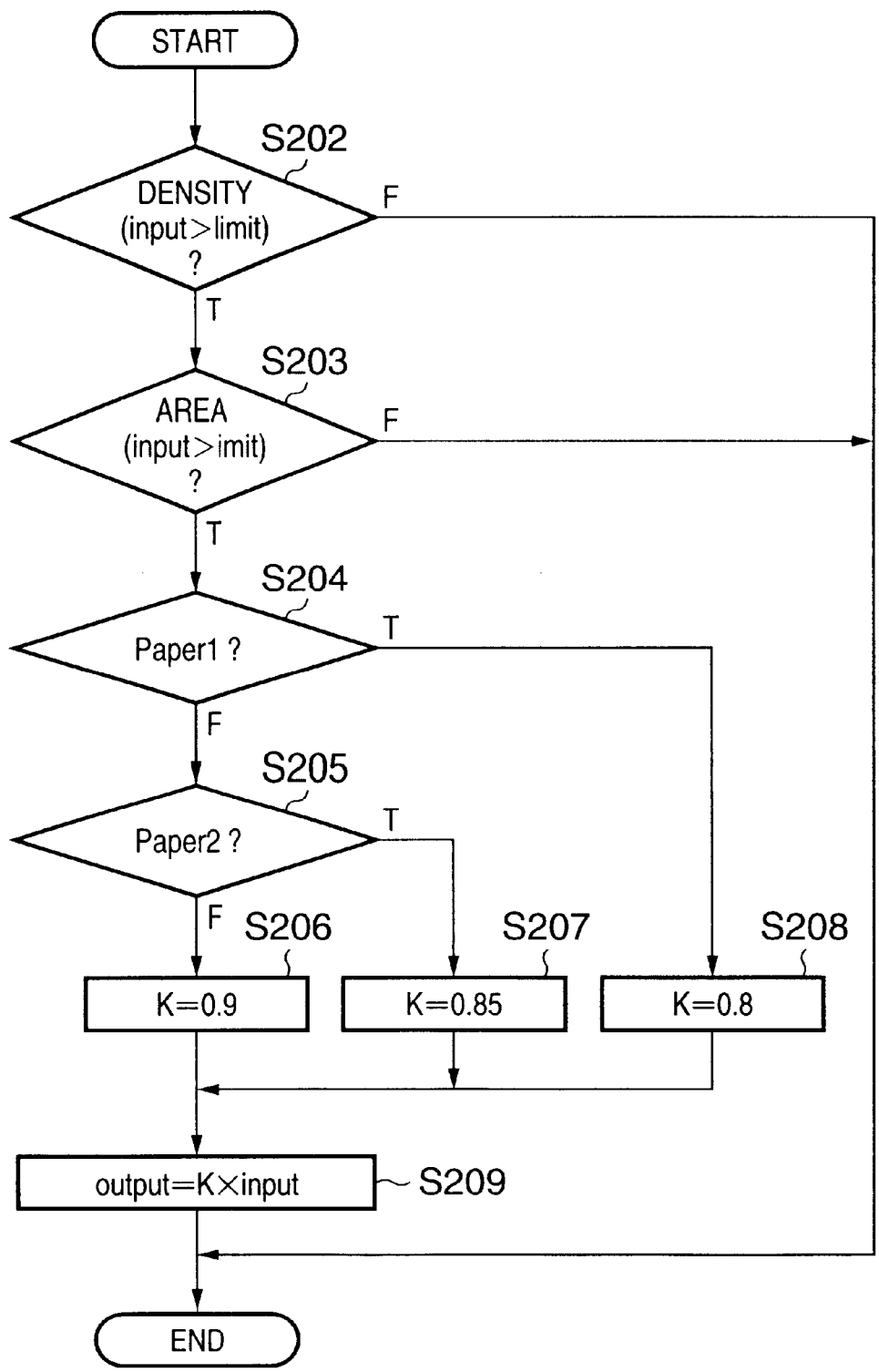
FIG. 2 is a flowchart showing printing image data generation operation.

In the case where the present invention is provided in the form of the above storage medium, the storage medium stores program code corresponding to the above-mentioned flow chart (shown in FIG. 2).

As many apparently widely different embodiments of the present invention can be made without departing from the spirit and scope thereof, it is to be understood that the invention is not limited to the specific embodiments thereof except as defined in the claims.

What is claimed is:

1. An inkjet printing apparatus for printing on a print medium based on a drawing command with the use of an inkjet printhead for discharging ink, comprising:

calculation means for calculating an area of a graphic to be drawn based on the drawing command;

first determination means for determining whether or not the calculated area exceeds a predetermined value;

second determination means for determining based on the drawing command whether or not a density value of the graphic exceeds a predetermined density value; and density conversion means for converting the density value in accordance with determination results of said first and second determination means.

2. The inkjet printing apparatus according to claim 1, wherein said density conversion means converts the density value when said first determination means determines that the calculated area exceeds the predetermined value and said second determination means determines that the density value exceeds the predetermined density value.

3. The inkjet printing apparatus according to claim 1, wherein said density conversion means reduces the density value at a predetermined rate.

4. The inkjet printing apparatus according to claim 1, wherein said first and second determination means are configured such that the predetermined value and the predetermined density value can be changed.

5. The inkjet printing apparatus according to claim 4, wherein said first and second determination means are configured such that the predetermined value and the predetermined density value are changed in accordance with a type of print medium used.

6. The inkjet printing apparatus according to claim 4, wherein said density conversion means is configured such that the predetermined rate is changed in accordance with a type of print medium used.

7. The inkjet printing apparatus according to claim 1, wherein the printhead discharges ink by utilizing heat energy and includes heat energy transducers for generating heat energy to be applied to the ink.

8. The inkjet printing apparatus according to claim 1, wherein the drawing command is written in a page description language.

9. An image data generation method for generating image data for printing on a print medium by an inkjet printhead for discharging ink, comprising:

a calculation step of calculating an area of an image to be drawn based on the drawing command;

a first determination step of determining whether or not the calculated area exceeds a predetermined value;

a second determination step of determining based on the drawing command whether or not a density value of the image exceeds a predetermined density value;

a density conversion step of converting the density value in accordance with determination results of said first and second determination steps; and an image data generation step of generating the image data based on the converted density value.

10. The image data generation method according to claim 9, wherein at said density conversion step, the density value is converted when it is determined at said first determination step that the area exceeds the predetermined value and it is determined at said second determination step that the density value exceeds the predetermined density value.

11. The image data generation method according to claim 9, wherein at said density conversion step, the density value is reduced at a predetermined rate.

12. The image data generation method according to claim 9, wherein the predetermined value and the predetermined density value at said first and second determination steps can be changed.

13. The image data generation method according to claim 12, wherein at said first and second determination steps, the predetermined value and the predetermined density value are changed in accordance with a type of print medium used.

14. The image data generation method according to claim 12, wherein at said density conversion step, the predetermined rate is changed in accordance with a type of print medium used.

15. The image data generation method according to claim 9, wherein the drawing command is written in a page description language.

16. A computer-readable program for implementing an image data generation method of generating image data for printing on a print medium by an inkjet printhead for discharging ink, said program comprising program codes corresponding to:

a calculation step of calculating an area of an image to be drawn based on the drawing command;

a first determination step of determining whether or not the calculated area exceeds a predetermined value;

a second determination step of determining based on the drawing command whether or not a density value of the image exceeds a predetermined density value;

a density conversion step of converting the density value in accordance with determination results of said first and second determination steps; and an image data generation step of generating the image data based on the converted value.

17. A storage medium storing a computer-readable program which implements an image data generation method of generating image data for printing on a print medium by an inkjet printhead for discharging ink, said storage medium storing program codes corresponding to:

a calculation step of calculating an area of an image to be drawn based on the drawing command;

a first determination step of determining whether or not the calculated area exceeds a predetermined value;

a second determination step of determining based on the drawing command whether or not a density value of the image exceeds a predetermined density value;

a density conversion step of converting the density value in accordance with determination results of said first and second determination steps; and an image data generation step of generating the image data based on the converted value.

* * * * *